United States Patent [19]

Morishita et al.

[11] Patent Number: 5,027,276
[45] Date of Patent: Jun. 25, 1991

[54] ELECTRIC POWER STEERING DEVICE HAVING A FAIL-SAFE RELAY

[75] Inventors: Mitsuharu Morishita; Kosaku Uota; Takeshi Yasukawa, all of Himeji, Japan

[73] Assignee: Mitsubishi Denki K.K., Tokyo, Japan

[21] Appl. No.: 333,923

[22] Filed: Apr. 6, 1989

[30] Foreign Application Priority Data

Apr. 14, 1988 [JP] Japan ................... 63-93939

[51] Int. Cl.[5] ............................................. B62D 5/04
[52] U.S. Cl. ................................ 364/424.05; 180/79.1; 180/142
[58] Field of Search ................... 364/424.05; 180/79.1, 180/141, 142

[56] References Cited

U.S. PATENT DOCUMENTS

| 4,573,545 | 3/1986 | Kalns | 180/79.1 |
|---|---|---|---|
| 4,621,327 | 11/1986 | Dolph et al. | 180/79.1 |
| 4,660,671 | 4/1987 | Behr et al. | 180/142 |
| 4,666,013 | 5/1987 | Shibahata et al. | 364/424.05 |
| 4,736,810 | 4/1988 | Morishita et al. | 180/79.1 |
| 4,754,828 | 7/1988 | Morishita et al. | 364/424.05 |
| 4,765,426 | 8/1988 | Shimizu | 180/79.1 |
| 4,802,543 | 2/1989 | Ishikura et al. | 180/79.1 |
| 4,837,690 | 6/1989 | Morishita et al. | 364/424.05 |
| 4,862,366 | 8/1989 | Morishita et al. | 180/79.1 |
| 4,869,333 | 9/1989 | Morishita et al. | 180/79.1 |
| 4,869,334 | 9/1989 | Marumoto et al. | 180/79.1 |

FOREIGN PATENT DOCUMENTS

| 0174138 | 3/1986 | European Pat. Off. . |
| 0249902 | 12/1987 | European Pat. Off. . |
| 8800545 | 1/1988 | PCT Int'l Appl. . |

Primary Examiner—Gary Chin
Attorney, Agent, or Firm—Sughrue, Mion, Zinn, Macpeak & Seas

[57] ABSTRACT

An electric power steering device is disclosed which comprises a fail-safe relay. The circuitry for operating the relay comprises the following: the neutral region detector circuit which generates an output when the steering torque applied by the operator is in the neutral region; a motor current detector circuit for detecting the motor current; an AND gate having inputs coupled to the above two circuits; a self-hold circuit for holding the output of the AND gate; and a relay interrupting circuit for interrupting the relay in response to the output of the self-hold circuit. Thus, the fail-safe relay is interrupted to disconnect the battery from the motor and clutch when the motor is energized in spite of the fact that the steering torque by the operator of the vehicle is in the neutral region.

4 Claims, 3 Drawing Sheets

TO LEFT ← | → TO RIGHT

OUTPUT TO LEFT ← | → OUTPUT TO RIGHT

ELECTRIC POWER STEERING DEVICE HAVING A FAIL-SAFE RELAY

BACKGROUND OF THE INVENTION

This invention relates to electric power steering devices for automobiles, and more particularly to a control circuit for electric power steering devices having a fail-safe relay for disconnecting the electric power source from the power steering device to restore the manual steering condition.

Automotive vehicles generally comprise a steering wheel by means of which the operator of the vehicle maneuvers the course of the vehicle and turns it to the right or to the left; the torque applied by the operator on the steering wheel is transmitted, via a steering shaft, etc., to the steered wheels of the vehicle to turn the course of the vehicle to the right or to the left. To assist the operator of the vehicle in turning the steering wheel, most automotive vehicles today use power assist mechanisms. Among them, hydraulic power assist mechanisms have been most common. However, electric power steering devices, which utilize an electric motor for providing an auxiliary power to assist the operator of the vehicle, are now gaining an increasing acceptance; they promise to be more economical, lightweighted, and reliable. Further, it is easy to use sophisticated electronic control circuitry in the case of electric power steering devices.

FIG. 1 shows a typical organization of the control circuitry for controlling the direction and magnitude of the torque of the electric motor of an electric power steering device. The circuitry comprises: a torque sensor 1 for detecting the torque applied by the operator of the vehicle; an electric motor 14, coupled to the steering shaft through a reduction gear, etc., for providing an auxiliary torque to assist the operator in turning the steering shaft; and a control circuit 16 which controls, in response to the steering torque detected by the torque sensor 1, the direction and the amount of the motor current supplied to the motor 14 so that a proper assisting torque may be provided by the motor 14.

The torque sensor 1 is coupled to the steering shaft (not shown) of the vehicle to sense the torque applied thereto by the operator of the vehicle via the steering wheel. FIG. 2 shows the relationship between the applied torque and the output of the torque sensor 1, wherein the steering torque T applied by the operator is plotted along the abscissa, while the output voltage V of the torque sensor 1 is plotted along the ordinate; the point $T_0$ on the abscissa corresponds to the neutral torque point at which the torque applied by the operator is null; the points on the abscissa to the right of point $T_0$ represent steering torques to turn the vehicle to the right; on the other hand, those points which are situated to the left of point $T_0$ represent steering torques to the left. The relationship between the steering torque T and the output voltage V is substantially linear as shown in FIG. 2: to the neutral or null torque point $T_0$ corresponds an output $V_0$; to left steering torques $T_1$ and $T_4$ correspond outputs $V_1$ and $V_4$, respectively; and to right steering torques $T_2$ and $T_3$ correspond outputs $V_2$ and $V_3$, respectively.

In response to the output V of the torque sensor 1, the control circuit 16 controls the output P of the electric motor 14 as illustrated in FIG. 3, wherein the output voltage V of the torque sensor 1 is plotted along the abscissa while the output P of the motor 14 is plotted along the ordinate.

When the output of the torque sensor 1 is in the region between $V_1$ and $V_2$, the output P of the motor 14 remains null; namely, when the steering torque T applied by the operator is in the region between points $T_1$ and $T_2$ (see FIG. 2), no current is supplied to the motor 14 to energize it. Thus, the region of the steering torque T between the points $T_1$ and $T_2$, or the region of the sensor output V between the points $V_1$ and $V_2$ corresponding thereto, constitutes the non-sensitive region in which no assisting power is provided by the motor 14.

When the steering torque T in the right steering direction becomes greater than the level represented by point $T_2$, an auxiliary torque in the same steering direction is provided by the motor 14 in the following manner: after the steering torque T exceeds point $T_2$ to raise the output voltage V of the torque sensor 1 above the level $V_2$ (as shown in FIG. 2), the output P of the motor 14 is increased substantially linearly with respect to the sensor output V as shown in FIG. 3, until the steering torque T reaches point $T_3$ to raise the sensor output V to a saturation level $V_3$; after the right steering torque T exceeds point $T_3$, the motor output P is held at the constant level Pmax. Thus, between the points $T_2$ and $T_3$, an assisting torque to the right which is substantially proportional to the steering torque T is provided by the motor 14; above point $T_3$, the assisting torque provided by the motor 14 is saturated, i.e. is held at a predetermined maximum level Pmax.

When, on the other hand, the steering torque T in the left steering direction becomes greater than the level represented by point $T_1$ (i.e. when steering torque T is in the region to the left of the point $T_1$ in FIG. 2), an auxiliary torque in the same (i.e. left) steering direction is provided by the motor 14 in a manner symmetrical to the above case of right steering direction. Namely, when the magnitude of the left steering torque T increases from level $T_1$ to level $T_4$ (i.e. moves to the left from point $T_1$ to point $T_4$ on the abscissa in FIG. 2), the sensor output V decreases from $V_1$ to $V_4$; in the region between $V_1$ and $V_4$, the output P of the motor 14 is substantially linear to the sensor output V as shown in FIG. 3, so that an assisting torque substantially proportional to the steering torque T is provided by the motor 14 in this region; when the steering torque T is above the left saturation point $T_4$ corresponding to the sensor output $V_4$, the motor output P is held at the constant maximum level Pmax. Thus, the left linear control region between sensor outputs $V_1$ and $V_4$ corresponds to the right linear control region between sensor outputs $V_2$ and $V_3$; the left saturated control region below sensor output $V_4$ corresponds to the right saturated control region above sensor output $V_3$.

The output of the motor 14 is controlled in response to the output of the torque sensor 1 in the above manner by the control circuit 16. Referring again to FIG. 1, let us now describe the organization and method of operation of the control circuit 16, which comprises a torque signal interface circuit 2 coupled to the output of the torque sensor 1 through input terminals 15A and 15B of the control circuit 16, and a microcomputer 3 supplied with the torque signal (i.e. the output of the torque sensor 1) via the interface circuit 2. The microcomputer 3 determines the direction and the magnitude of the assisting torque which are to be provided by the motor 14, on the basis of the torque signal outputted from the sensor 1; namely, in response to the input signal from the torque signal interface circuit 2, which signal corresponds to the above output voltage V of the torque sensor 1, the microcomputer 3 determines the rotational direction of the motor 14 corresponding to the steering torque T, and the output P of the motor 14 corresponding to the sensor output voltage V, on the basis of the relationships shown in FIGS. 2 and 3, respectively. The direction and the magnitude of the output torque of the motor 14 are controlled by the motor driver circuit 10 in accordance with these determinations of the microcomputer 3, as described in the following.

The right and the left direction signal from the microcomputer 3 are outputted to the motor driver circuit 10 through the right and left interface circuits 4 and 5, respectively. Namely, when the steering torque T is in the right steering direction and hence the sensor output voltage V is above the level $V_0$ corresponding to the neutral steering torque $T_0$, a right direction signal is outputted from the microcomputer 3 to the motor driver circuit 10 through the right direction signal interface 4; when, on the other hand, the steering torque T is in the left steering direction and hence the sensor output voltage V is below the level $V_0$, a left direction signal is outputted from the microcomputer 3 to the motor driver circuit 10 through the left direction signal interface 5.

On the other hand, the digital signal indicating the motor output torque P, which corresponds to the sensor output level V with respect to the relationship shown in FIG. 3, is outputted from the microcomputer 3 to the digital-to-analog converter 6, wherein it is converted into an analog signal indicating the motor output P; in response to this analog signal outputted from the digital-to-analog converter 6, a pulse width modulation circuitry (including an error amplifier 7, pulse width modulator 8, reference frequency oscillation circuit 9, a motor current detector circuit 11, and a motor current detecting resistor 12) generates pulses at a predetermined frequency whose pulse width varies in proportion to the magnitude of the motor output level P determined by the microcomputer 3. This pulse width modulation is effected in the following manner: Namely, the resistor 12 develops thereacross a voltage corresponding to the amount of the motor current supplied to the motor 14 from the motor driver circuit 10; the voltage developed at the output terminal of the detecting resistor 12 corresponding to the amount of the motor current is supplied to the motor current detector circuit 11, which in its turn outputs a signal corresponding to the amount of the motor current; the detecting circuit 11, however, limits its output under a predetermined level, or cuts off its output, when the voltage outputted from the resistor 12 exceeds a predetermined level. The error amplifier 7 compares the output of the digital-to-analog converter 6 and that of the motor current detector circuit 11, and amplifies the difference therebetween; namely, the amplifier 7 outputs a signal corresponding to the error of the motor current with respect to the motor output level P determined by the microcomputer 3. In response to the output of the amplifier 7, the pulse width modulator 8 modulates the width of the pulses outputted therefrom, on the basis of the output of the oscillation circuit 9 which oscillates at a predetermined frequency. The pulse width modulator 8 outputs a pulse train whose width varies substantially in proportion to the motor output level determined by the microcomputer 3.

In response to the pulse width modulated signal from the modulator 8 and a direction signal from the direction signal interface circuits 4 and 5, the motor driver circuit 10 supplies a current corresponding to these signals to the motor 14 through the output terminals 13A and 13B of the driver circuit 10: the direction of the current supplied from the driving circuit 10 to the motor 14 corresponds to the right or the left direction signal received from the interface circuit 4 or 5; the on-time thereof, on the other hand, corresponds to the duty factor of the pulse train outputted from the modulator 8. Namely, when a right direction signal is received from the interface circuit 4, the driver circuit 10 supplies the motor current in a direction wherein the motor 14 generates a torque to turn the steering shaft to the right, thereby assisting the turning operation of the operator of the vehicle to the right direction; when, on the other hand, a left direction signal is received from the interface 5, the driver circuit 10 supplies the motor current in the other direction wherein the motor 14 generates a torque to turn the steering shaft to the left. Further, the driver circuit 10 generally comprises switching power transistors which are turned on and off in response to the pulses outputted from the modulator 8, so that the on-time of the motor current corresponds to the pulse width of the pulses outputted from the modulator 8. Thus, the output of the motor 14 is controlled to the level determined by the microcomputer 3 on the basis of the output signal of the torque sensor 1.

The power steering devices as described above, however, suffer from the following disadvantage. Namely, when the motor 14 is driven erroneously in the neutral or non-sensitive region of the torque sensor 1, due to the malfunctioning of the microcomputer 3, etc., the motor acts against the intention of the operator of the vehicle by supplying a torque in a direction opposite to that of the torque applied by the operator, which is extremely dangerous.

SUMMARY OF THE INVENTION

It is a primary object of this invention therefore to provide an electric power steering device which is enhanced in safety and reliability; in particular, this invention aims at providing an electric power steering device which is capable of restoring the manual steering condition when the motor is driven in the neutral or non-sensitive region.

It is an additional object of this invention to provide such a power steering device which is simple in organization and low in cost.

The above objects are accomplished in accordance with the principles of this invention in an electric power steering device which comprises a fail-safe circuit interrupter relay for interrupting the supply of operating current to the electric power steering device. It is understood that the power steering device comprises usual elements: an electric motor coupled to the steering shaft to provide an auxiliary torque thereto; a clutch interposed between the motor and the steering shaft to connect and disconnect the motor to and from the steering shaft; torque sensor for detecting the steering torque applied by the operator of the vehicle; a microcomputer coupled to the torque sensor to determine the direction and amount of the auxiliary torque which is to be supplied by the motor; and electric power source, such as storage battery of the vehicle, which supplies operating current to the motor and the clutch through the motor driver circuit and the clutch driver circuit, respectively.

The circuit portion which operates the fail-safe relay characteristic of this invention comprises the following: neutral torque region detector circuit coupled to the torque sensor for determining whether or not the steering torque applied by the operator is in the neutral region in which the auxiliary torque that is to be supplied by the motor is null, the circuit generating an output signal when the steering torque is in the neutral region; motor current detector circuit coupled to the motor driver circuit for detecting the motor current, the circuit generating an output signal when a current is supplied to the motor via the motor driver circuit; and a relay interrupting circuit which interrupts the fail-safe relay to disconnect the motor driver and the clutch driver circuit from the electric power source when output signals are generated both from the neutral region detector and the motor current detector circuit. This relay interrupting circuit may include an AND gate having a pair of inputs coupled to the outputs of the neutral region detector and motor current detector circuit, respectively, and a self-hold for holding the output of the AND gate.

According to this invention, the clutch and the motor of the power steering device are thus separated from the power source to restore the manual steering state, when the electric motor is energized in the situation in which the steering torque applied by the operator is in the neutral region. Consequently, the safety of the device is greatly enhanced.

BRIEF DESCRIPTION OF THE DRAWINGS

The novel features which are believed to be characteristic of our invention are set forth with particularity in the appended claims. Our invention itself, however, both as to its organization and method of operation, may best be understood by reference to the following detailed description of the preferred embodiments, taken in conjunction with the accompanying drawings, in which:

In the drawings, like reference numerals represent like or corresponding parts or portions.

DETAILED DESCRIPTION OF THE PREFERRED EMBODIMENT

Figure 1:
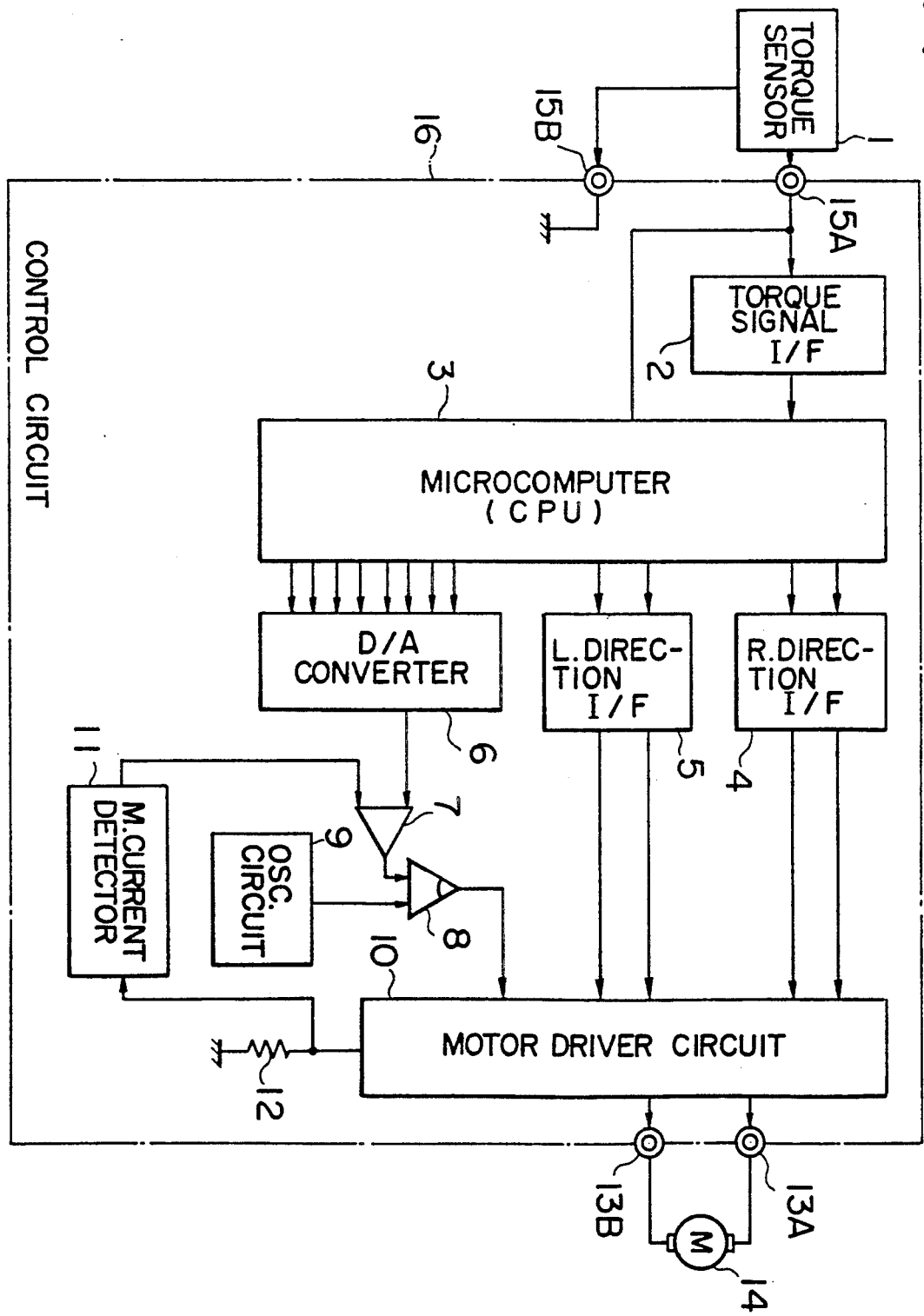
FIG. 1 is a block diagram of electric power steering device which is related to the device according to this invention.
Figure 4:
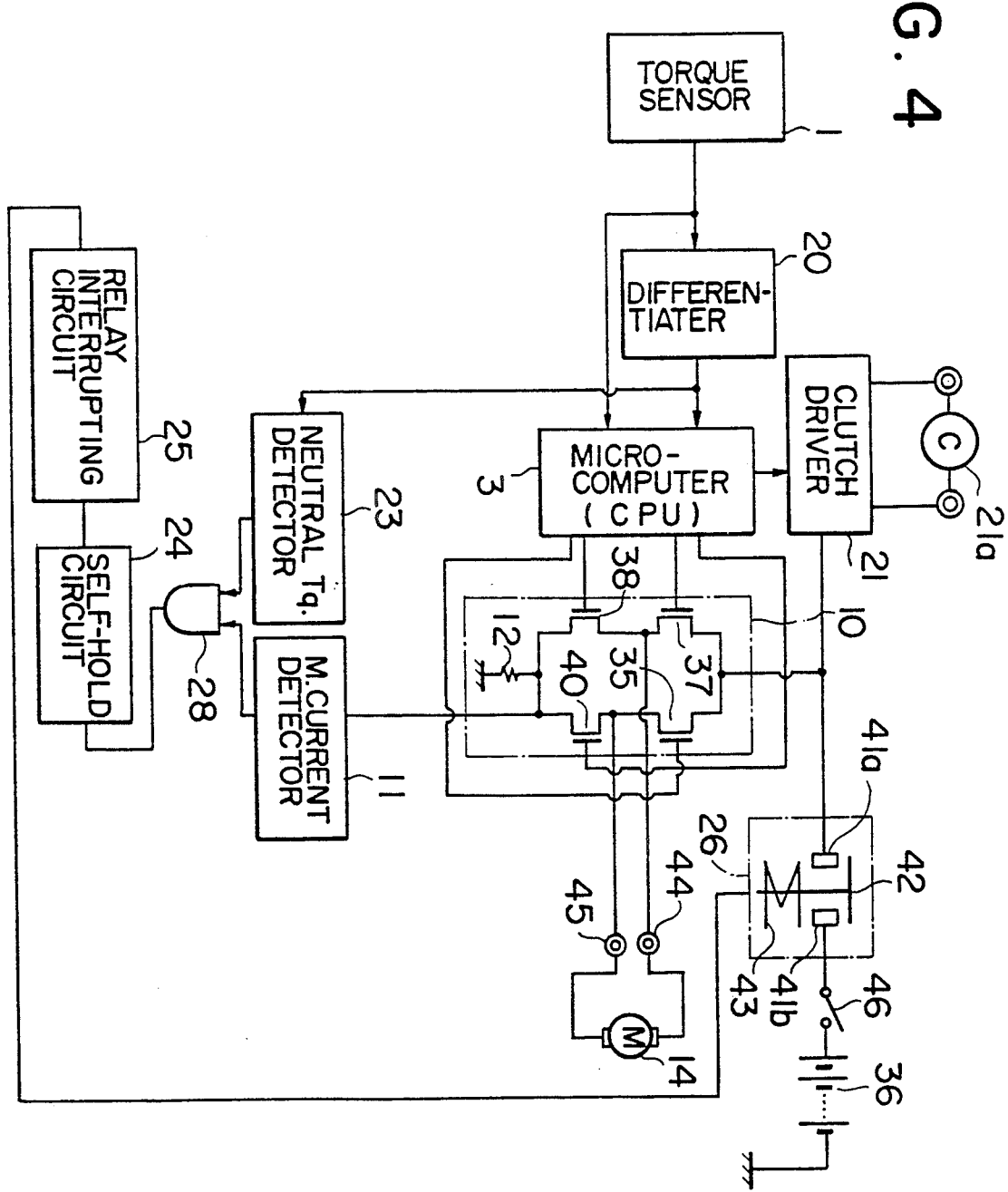
FIGS. 4 is a block diagram similar to that of FIG. 1, but showing a power steering device according to this invention.

Referring now to FIG. 4 of the drawings, an embodiment of this invention is described, which is similar to the power steering device of FIG. 1.

The power steering device shown in FIG. 4 comprises an electric motor 14 for supplying an auxiliary torque to the steering shaft of the vehicle (not shown), and a clutch 21a for connecting and disconnecting the motor 14 to and from the steering shaft. The motor driver circuit 10 and the clutch driver circuit 21 are supplied with an operating electric current of the motor 14 and the clutch 21a, respectively, from the storage battery 36 through a key switch 46 of the vehicle and a fail-safe relay 26, which is operated by a relay operating circuit portion according to this invention; the relay operating circuit portion includes a motor current detector circuit 11, a neutral torque region detector circuit 23, and AND gate 28, a self-hold circuit 24, and a relay interrupting circuit 25, which are described in the following.

Figure 2:
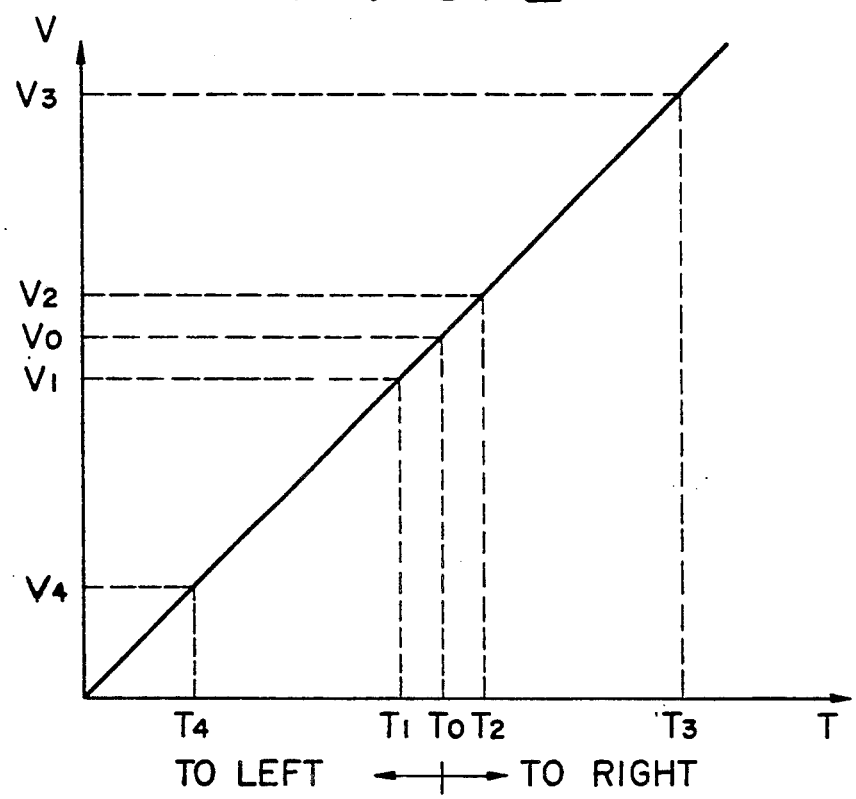
FIG. 2 shows the relationship between the steering torque applied by the operator of the vehicle and the output voltage of the torque sensor.
Figure 3:
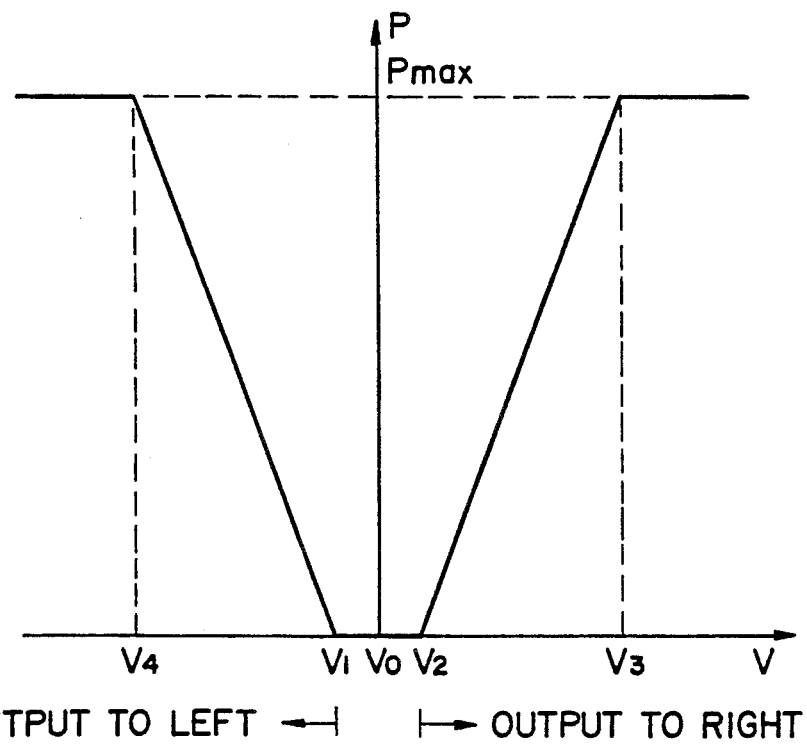
FIG. 3 shows the relationship between the output voltage of the torque sensor and the output of the electric motor of an electric power steering device.

The circuitry for controlling the current supplied to the motor 14 is similar to that of the power steering device of FIG. 1. Namely, the torque sensor 1 detects the steering torque applied by the operator of the vehicle to the steering shaft via the steering wheel, and outputs a voltage signal as shown in FIG. 2. This output signal (i.e. torque signal) of the torque sensor 1 is supplied to the microcomputer 3 directly and via the differentiating circuit 20 which outputs a signal that is proportional to the differential of the torque signal with respect to time. The microcomputer 3 determines the direction and amount of the auxiliary torque which is to be supplied by the motor 10 in response to the torque signal supplied thereto directly and via the differentiating circuit 20, on the basis of the relationships such as those shown in FIGS. 2 and 3. The motor driver circuit 10, coupled to the battery 36 through the relay 26 and switch 46, comprises four power MOSFETs 35, 37, 38, and 40 connected in a bridge circuit relationship. The microcomputer 3 controls the gate voltages of the MOSFETs 35, 37, 38, and 40 in accordance with its determination of the direction and the amount of the auxiliary torque. Namely, according to the determined direction, one of two MOSFETs 35 and 37 (for example the MOSFET 35) is turned on; one of the other two MOSFETs 38 and 40 which is at a position diagonally opposite to the above MOSFET that is turned on (namely, if the above MOSFET that is turned on is MOSFET 35, the MOSFET 38 diagonally opposite thereto) is turned on intermittently by a pulse width modulated signal (i.e. a pulse train whose pulse width varies in proportion to the determined amount of the auxiliary torque). The motor 14 is thus supplied, via the output terminals 44 and 45 of the motor driver circuit 10, with a current from the battery 36 whose direction and amount (or on-time) correspond to those determined by the microcomputer 3. (In the representation of FIG. 4, the microcomputer 3 may be understood to include the functions of the circuit elements 4 through 11 of FIG. 1.)

The electromagnetic clutch 21a is driven by the clutch driver circuit 21 which supplies the current from the battery 36 to the clutch 21a to energize an electromagnetic coil of the clutch 21a. The clutch 21a is energized by an energization signal from the microcomputer 3 to connect the motor 14 to the steering shaft when the key switch 46 is made.

The fail-safe circuit interruptor relay 26 comprises a pair of fixed contacts 41a and 41b, a movable contact member 42 movable between a making and a breaking position, and an electromagnetic coil 43 for operating the movable contact member 42. The relay 26 is made when the key switch 46 is turned on, so that the battery 36 is coupled to the clutch driver circuit 21 and the motor driver circuit 10. On the other hand, the relay is interrupted in response to the output from the relay interrupting circuit 25 to separate the battery 36 from the motor driver circuit 10 and the clutch driver circuit 21. The organization and operation of the relay operating circuit portion including the circuit 25, which is characteristic of this invention is as follows:

The neutral torque region detector circuit 23 is coupled to the output of the differentiating circuit 20 and generates an output signal when the torque signal V is in the neutral or non-sensitive region (e.g. the region between the levels $V_1$ and $V_2$ in FIG. 3) in which the output of the motor 14 should be controlled to null. The motor current detector circuit 11, on the other hand, generates an output signal when a current is supplied to the motor 14 from the battery 36 via the driver circuit 10. Namely, the detecting resistor 12, coupled across a terminal of the motor driver circuit 10 and the ground, develops thereacross a voltage corresponding to the amount of current supplied to the motor 14; the motor current detector circuit 11 generates an output signal in response to this voltage, being coupled to the terminal of the resistor 12 at which this voltage corresponding to the motor current is developed. An AND gate 28, having a pair of inputs coupled to the outputs of the neutral torque region detector circuit 23 and the motor current detector circuit 11, performs an AND operation on the outputs of these circuits 23 and 11. Thus, the output signal of the AND gate 28 is generated in the case where the motor 14 is energized in spite of the fact that steering torque by the operator is in the neutral region (e.g. the region between $T_1$ and $T_2$ in FIG. 2). The self-hold circuit 24 retains the output of the AND gate 28 and generates a continuing output signal when an output signal is received from the AND gate 28; in response to the output of self-hold circuit 24, the relay interrupting circuit 25 interrupts the relay 26 to separate the motor driver circuit 10 and the clutch driver circuit 21 from the battery 36.

Thus, when, due to a malfunctioning of the microcomputer 3, etc., the motor 14 is supplied with an operating current in a time in which the steering torque applied by the operator of the vehicle is in the neutral region in which the motor 14 should not be energized, the relay 26 is interrupted to separate the clutch driver circuit 21 and the motor driver circuit 10 from the battery 36. Consequently, the clutch 21a is de-energized to disconnect the motor 14 from the steering shaft; in addition, the supply of current to the motor 14 is stopped. Thus, the steering of the vehicle is rendered to the manual steering state to guarantee the safety.

While we have described and shown the particular embodiment of our invention, it will be understood that many modifications may be made without departing from the spirit thereof; we contemplate by the appended claims to cover any such modifications as fall within the true spirit and scope of our invention.

What is claimed is:

1. An electric power steering device for an automotive vehicle which includes a steering wheel operated by an operator of the vehicle, at least one steered wheel, and a steering shaft operatively coupling the steering wheel to the steered wheel, said power steering device comprising:

an electric motor coupled to the steering shaft to provide an auxiliary torque to the steering shaft of the vehicle;

a clutch interposed between said electric motor and the steering shaft of the vehicle to connect and disconnect said electric motor to and from the steering shaft;

torque sensor means for detecting a steering torque of the steering shaft applied by the operator of the vehicle via the steering wheel of the vehicle, said torque sensor means outputting an output signal which is proportional to said steering torque;

computation means, including a microcomputer coupled to an output of said torque sensor means, for determining a direction and an amount of the auxiliary torque which is to be provided by said electric motor to the steering shaft;

an electric power source;

motor driver circuit means, coupled to an output of said computation means, for controlling a current supplied from said electric power source to said electric motor based on the direction and amount determined by said computation means;

clutch driver circuit means for supplying an electric current from said electric power source to said clutch, thereby energizing said clutch to connect said electric motor to the steering shaft;

a circuit interruptor relay inserted between said electric power source and said motor driver and clutch driver circuit means;

neutral torque region detector circuit means coupled to an output of said torque sensor means, for generating, based on the output of said torque sensor means, an output signal when said steering torque is in a neutral torque region in which the auxiliary torque which is to be provided by the electric motor is null;

motor current detector circuit means, coupled to said motor driver circuit means, for generating an output signal when a current is being supplied to the electric motor from said electric power source via the motor driver circuit means; and relay interrupting circuit means, including an AND gate having a pair of inputs coupled to said neutral torque region detector circuit means and said motor current detector circuit means so as to receive inputs directly therefrom, for interrupting said circuit interruptor relay to separate said motor driver and clutch driver circuit means from said electric power source when both output signals of said neutral torque region detector circuit means and motor current detector circuit means are generated.

2. An electric power steering device as claimed in claim 1, wherein said relay interrupting circuit means further comprises:

a self-hold circuit means for holding an output of said AND gate.

3. An electric power steering device as claimed in claim 1 or 2, further comprising a differentiating circuit, for generating an output proportional to a differential of said output of said torque sensor means with respect to time, inserted between an output of said torque sensor means and inputs of said microcomputer of the computation means and said neutral torque detector circuit means.

4. An electric power steering device as claimed in claim 1, wherein said electric power source comprises a battery.

* * * * *